United States Patent Office 3,346,656
Patented Oct. 10, 1967

3,346,656
PREPARATION OF DIMETHYLDECALINS
Abraham Schneider, Los Angeles, Calif., assignor to Sun Oil Company, Philadelphia, Pa., a corporation of New Jersey
No Drawing. Filed Jan. 10, 1963, Ser. No. 250,503
4 Claims. (Cl. 260—666)

This application is a continuation-in-part of copending U.S. patent applications, Ser. Nos. 86,304 and 86,306, filed Feb. 1, 1961 both of which are now abandoned. This invention relates to the preparation of dimethyldecalins by the catalytic dimerization of $C_6$ naphthenes.

Dimethyldecalins other than those which have gem substitution can be dehydrogenated to form dimethylnaphthalenes. The latter can be partially oxidized to yield dibasic acids which can be utilized in the preparation of resins. While dimethyldecalins occur in petroleum, they are most difficult to isolate therefrom. The present invention provides a means of preparing dimethyldecalins from $C_6$ naphthenes, such as methylcyclopentane or cyclohexane, which are more easily obtained from petroleum.

Tetramethylbenzenes, of which there are three isomers namely, durene, isodurene and prehnitene, are used in various organic syntheses, for example, in the preparation of polycarboxylic aromatic acids. The present invention also provides a means of preparing tetramethylcyclohexanes which can be converted to tetramethylbenzenes by dehydrogenation.

According to one embodiment of this invention, a $C_6$ naphthene or a mixture of such naphthenes is contacted at a temperature in the range of $-20°$ C. to $80°$ C., preferably $20°$ C. to $75°$ C., with a preformed liquid catalyst complex obtained by reacting a paraffin hydrocarbon having at least eight carbon atoms per molecule with $AlCl_3$—HCl or $AlBr_3$—HBr. Under these conditions the naphthene dimerizes to form a $C_{12}$ naphthene which isomerizes to an equilibrium mixture of dimethyldecalins. This reaction involves the abstraction of a hydrogen atom from each $C_6$ naphthene molecule. The hydrogen reacts with the catalyst complex and slowly causes it to disappear. As a result of this reaction $AlCl_3$ or $AlBr_3$ is released from the complex and dissolves in the hydrocarbon phase, while HCl or HBr is simultaneously evolved as a gas from the complex.

According to a second embodiment of the invention, dimethyldecalins and tetramethylcyclohexanes can be prepared simultaneously by reacting, under certain conditions hereinafter specified, one or more paraffin hydrocarbons having at least seven carbon atoms per molecule with a $C_6$ naphthene.

In my copending application, U.S. Ser. No. 39,824, filed June 30, 1960, now U.S. Patent No. 3,103,540 a process has been described and claimed for making tetramethylcyclohexanes from a $C_6$ naphthene and a paraffin hydrocarbon having seven or more carbon atoms, which reactants are the same as used in the second-mentioned embodiment of the present process. In the process of said application the reaction system is homogeneous, with the catalyst, which is a combination of $AlBr_3$ and HBr, being dissolved in the hydrocarbon reactants; and in order to avoid undesirable cracking reactions, there must be present in the reaction mixture from 5% to 35% by weight, based on the total hydrocarbon present, of a $C_7$–$C_9$ naphthene, and also the reaction must be carried out in the presence of hydrogen at a partial pressure of 25–500 p.s.i. In such reaction substantially no dimethyldecalins are produced. In the second-mentioned embodiment of the present process different reaction conditions are employed and substantial amounts of dimethyldecalins are produced in addition to the tetramethylcyclohexanes.

Any $C_6$ naphthene is suitable for use as a charge stock in either embodiment of the invention. Examples are cyclohexane, methylcyclopentane, dimethylcyclobutane, ethylcyclobutane or mixtures thereof. Under the reaction conditions the $C_6$ naphthene will readily equilibrate to an equilibrium mixture of $C_6$ naphthenes of which cyclohexane predominates but which also contains a substantial amount of methylcyclopentane. The methylcyclopentane will undergo dimerization to $C_{12}$ naphthenes which isomerize to an equilibrium mixture of dimethyldecalins. As the methylcyclopentane is consumed more is formed from the cyclohexane by equilibration.

In the second embodiment of this invention, a mixture of any $C_6$ naphthene and any paraffin hydrocarbon material having seven or more carbon atoms per molecule can be employed as the starting material. The paraffin used can be any heptane, octane, nonane or higher molecular weight paraffin, for example, paraffin wax or mixtures of such paraffins. An isooctane or a mixture of isooctanes is the preferred paraffin charge component.

In preparing the liquid complex used as catalyst in the present system any paraffin hydrocarbon or mixture of such paraffins having eight or more carbon atoms can be used, but it is desirable to use a branched paraffin, e.g., one having at least two brances, in order to reduce the time for preparing the complex.

Preparation of the catalyst complex comprises dissolving or suspending $AlCl_3$ or $AlBr_3$ in the paraffin hydrocarbon and passing HCl or HBr into the mixture. This can be done at room temperature, although the use of an elevated temperature may be desirable to increase the rate of reaction. For best results at least five moles of the paraffin per mole of $AlCl_3$ or $AlBr_3$ should be employed. Under these conditions some of the paraffin apparently breaks into fragments, yielding a $C_4$ fragment which becomes the hydrocarbon portion of the complex. As the reaction proceeds the mixture becomes milky and the yellow liquid complex then precipitates from the hydrocarbon phase. Addition of HCl or HBr is continued until the milky appearance has disappeared. For obtaining the most active catalyst complex the addition of HCl or HBr should be stopped at this point. The resulting complex is a stable colored liquid having high catalytic activity at temperatures as low as $-20°$ C.

The preformed catalyst complex used in this invention is to be distinguished from other Friedel-Crafts catalyst systems which at first blush would appear to be identical thereto, for example, those catalyst systems employing an aluminum halide dissolved in a hydrocarbon and promoted with a halogen halide. The catalyst complex of the instant invention continuously releases aluminum chloride or aluminum bromide, whereas in prior art catalyst systems, the concentration of the aluminum halide is constantly being reduced due to the complex formation of the hydrocarbon reactants therewith. Furthermore in the instant system hydrogen halide is evolved as a gas as contrasted with the so-called conventional system in which a hydrogen halide is generally constantly added in an attempt to counteract the depletion reaction of the aluminum halide with the hydrocarbon.

The catalyst complex can be used in the reaction mixture in widely varying proportions, for example, from 5% to 500% by weight based on the hydrocarbon. The larger the amount of catalyst used the faster will be the reaction rate and of course the less often will additional complex have to be added to make up for that which is lost by physical means.

As previously indicated the present process can be employed to form a mixture of tetramethylcyclohexanes and dimethyldecalins and furthermore can be adjusted to favor the formation of either tetramethylcyclohexanes or dimethyldecalins. Formation of the dimethyldecalins is favored by the use of a relatively high ratio of the $C_6$ naphthene to the charge paraffin and a relatively high reaction temperature, while lower $C_6$ naphthene to paraffin ratios and lower reaction temperatures are favorable for the formation of tetramethylcyclohexanes. In order to cause the latter to predominate in the reaction product, it is desirable to employ a $C_6$ naphthene to paraffin ratio in the range of 2:1 to 0.5:1 and a temperature less than about 45° C. For the dimethyldecalins to predominate over the tetramethylcyclohexanes, it is desirable to have a $C_6$ naphthene to paraffin ratio in the reaction mixture within the range of 100:1 to 10:1 and to use a temperature of 35–60° C.

It has been stated above that the instant invention is to be conducted at a temperature in the range of from about −20° C. to about 80° C., preferably from about 20° C. to 75° C. It is important to the success of the instant invention that the reaction temperature not be allowed to exceed about 80° C. If this temperature is exceeded the naphthene becomes converted to an olefin and dissolves in the catalyst complex and becomes unavailable as a further reactant.

In accordance with the second embodiment of this invention wherein a $C_6$ naphthene is reacted with a paraffin hydrocarbon it is important to the success of this invention that the paraffinic hydrocarbon contain at least seven carbon atoms. When paraffins having six or less carbon atoms are used, no substantial yields of tetramethylcyclohexanes are obtainable.

The following examples illustrate the invention more specifically:

EXAMPLE I

*Preparation of dimethyldecalins by dimerization of methylcyclopentane*

A catalyst complex was prepared by admixing 5 g. of $AlBr_3$ with 8 ml. of dimethylhexanes and then bubbling in HBr until no further absorption thereof was obtained. The complex separated from the excess dimethylhexanes as a yellow oily layer which contained about 1 g. of HBr, and the excess hydrocarbon was removed. A reaction mixture was prepared in a small glass reactor, the mixture being composed of 6.0 g. of the complex and 5.0 ml. of methylcyclopentane. The mixture was continuously shaken on a rocker arm and reacted at a temperature of 27° C. At times of 65, 195 and 320 minutes, small samples of the hydrocarbon phase were taken and analyzed for hydrocarbon composition by vapor phase chromatography. After the last-mentioned sampling the reaction temperature was raised to 51° C. and the reaction was conducted for 60 minutes more, after which a sample of the hydrocarbon phase was tested. Results are shown in Table I.

TABLE I

| Product Composition (wt. percent) | Reaction Time (minutes) | | | |
|---|---|---|---|---|
| | 65 | 195 | 320 | 60 (at 51° C.) |
| $C_4$ paraffins | 0.3 | 0.5 | 0.7 | 1.4 |
| $C_5$ paraffins | 0.2 | 0.2 | 0.3 | 0.5 |
| $C_6$ paraffins | 0.4 | 0.4 | 0.5 | 0.9 |
| Methylcyclopentane | 11.2 | 11.0 | 10.6 | 14.9 |
| Cyclohexane | 85.5 | 82.2 | 80.8 | 69.8 |
| $C_7$ naphthenes | 0.4 | 0.6 | 0.7 | 1.0 |
| $C_8$ naphthenes | 0.3 | 0.4 | 0.6 | 1.0 |
| $C_9$ naphthenes | 0.1 | 0.3 | 0.3 | 0.6 |
| $C_{10}$ naphthenes | 0.1 | 0.6 | 0.8 | 0.7 |
| Methyldecalins | | Trace | Trace | 0.1 |
| Dimethyldecalins | 1.5 | 3.7 | 4.8 | 9.3 |

The tabulated data show that dimethyldecalins are formed as the major product but that the rate of formation at 27° C. is considerably slower than is desirable. This indicates that it is preferable to use a higher reaction temperature. From the data it can be calculated that 15.3% of the $C_6$ naphthene was consumed in the total reaction time used and that about 61% by weight of the amount consumed was converted to dimethyldecalins.

EXAMPLE II

*Preparation of dimethyldecalins by dimerization of methylcyclopentane*

This example was carried out in the same manner as the preceding example except that in this case the reaction temperature was about 60.8° C. throughout the run. Results are shown in Table II.

TABLE II

| Product Composition (wt. percent) | Reaction Time (minutes) | | |
|---|---|---|---|
| | 60 | 120 | 240 |
| $C_4$ paraffins | 1.0 | 1.5 | 2.7 |
| $C_5$ paraffins | 0.4 | 0.6 | 0.7 |
| $C_6$ paraffins | 0.9 | 1.4 | 2.4 |
| Methylcyclopentane | 17.6 | 16.8 | 15.7 |
| Cyclohexane | 68.8 | 65.1 | 60.0 |
| $C_7$ naphthenes | 1.0 | 1.2 | 1.5 |
| $C_8$ naphthenes | 1.1 | 1.4 | 2.3 |
| $C_9$ naphthenes | 0.5 | 0.7 | 1.0 |
| $C_{10}$ naphthenes | 0.5 | 0.6 | 1.0 |
| Decalin | Trace | Trace | Trace |
| Methyldecalin | Trace | 0.1 | 0.2 |
| Dimethyldecalin | 8.2 | 10.5 | 12.4 |

From these data it can be calculated that 24.3% of the $C_6$ naphthene was consumed in 240 minutes and that 51% of the amount consumed was converted to dimethyldecalins. It can be seen that the rate of formation of dimethyldecalins continuously decreased with time. This was due to partial destruction of the catalyst complex by the hydrogen abstracted from the hydrocarbon reactant. Such decrease in rate could be avoided by employing a considerably larger proportion of the catalyst complex.

EXAMPLE III

*Preparation of mixture of dimethyldecalins and tetramethylcyclohexane*

This example was carried out in a similar manner as the preceding example except that in this case the charge mixture contained 4.5 ml. of methylcyclopentane and 0.5 ml. of n-octane, corresponding to a volume ratio of $C_6$ naphthene to paraffin of 9:1. Results are shown in Table III.

TABLE III

| Product composition (wt. percent) | Reaction time (minutes) | |
|---|---|---|
| | 120 | 148 |
| $C_4$ paraffins | 6.5 | 6.8 |
| $C_5$ paraffins | 0.9 | 0.9 |
| $C_6$ paraffins | 0.4 | 0.5 |
| Methylcyclopentane | 8.8 | 4.4 |
| Cyclohexane | 67.7 | 69.1 |
| $C_7$ naphthenes | 0.6 | 0.9 |
| $C_8$ naphthenes | 0.7 | 1.0 |
| $C_9$ naphthenes | 0.8 | 1.1 |
| $C_{10}$ naphthenes | 7.7 | 7.9 |
| Methyldecalins | | 0.2 |
| Dimethyldecalins | 5.9 | 7.2 |

In this case the $C_{10}$ naphthenes (mainly tetramethylcyclohexanes) and dimethyldecalins were formed in approximately equal amounts. The yield of $C_{10}$ naphthenes, based on the amount of the two hydrocarbon reactants consumed, was about 30% and that of the dimethyldecalins, based on the $C_6$ naphthene consumed, was about 44%.

EXAMPLE IV

*Preparation of mixture of dimethyldecalins and tetramethylcyclohexane in which tetramethylcyclohexane predominates*

A catalyst complex was prepared as stated in Example I. A reaction mixture was prepared in a small glass reactor, the mixture being composed of 6.0 g. of the complex, 2.0 ml. of methylcyclopentane and 2.0 ml. of n-octane. The mixture was continuously shaken on a rocker arm and reacted at a temperature of 27° C. At times of 55, 177 and 319 minutes, small samples of the hydrocarbon phase were taken and analyzed for hydrocarbon composition by vapor phase chromatography. Results are shown in Table IV.

TABLE IV

| Product composition (wt. percent) | Reaction time (minutes) | | |
| --- | --- | --- | --- |
| | 55 | 177 | 319 |
| C₄ paraffins | 13.7 | 21.7 | 25.3 |
| C₅ paraffins | 2.5 | 4.0 | 4.5 |
| C₆ paraffins | 0.7 | 1.1 | 1.4 |
| Methylcyclopentane | 4.6 | 4.3 | 2.2 |
| Cyclohexane | 25.1 | 25.5 | 22.1 |
| Doubly branched octanes | 3.8 | 1.3 | |
| Singly branched octanes | 8.3 | 2.8 | 1.9 |
| Normal octane | 3.3 | | |
| C₈ naphthenes | 0.9 | 1.5 | 1.9 |
| C₉ naphthenes | 1.6 | 2.6 | 3.2 |
| C₁₀ naphthenes | 23.0 | 30.6 | 31.0 |
| Methyldecalins | Trace | 0.2 | 0.5 |
| Dimethyldecalins | 2.5 | 4.3 | 6.0 |

The tabulated data show that both C₁₀ naphthenes and dimethyldecalins were formed, with the C₁₀ naphthenes predominating. The C₁₀ naphthenes were mainly tetramethylcyclohexanes. From the data it can be calculated that about 74% of the two hydrocarbon reactants were consumed in 319 minutes and that about 42% by weight of the amount consumed was converted to C₁₀ naphthenes. Also it can be calculated that about 23% of the C₆ naphthenes consumed was dimerized to dimethyldecalins. The C₄–C₆ paraffins formed were mainly isoparaffins. The data indicate that a substantial amount of isobutane was formed. It may be noted that the unconsumed C₆ naphthene had isomerized largely to cyclohexane.

The following example demonstrates why it is necessary in the reaction between a C₆ naphthene and a paraffinic hydrocarbon that the paraffinic hydrocarbon contain at least seven carbon atoms.

EXAMPLE V

A catalyst complex as set forth in Example I was used. Three different reaction mixtures were prepared in small glass reactors. The first mixture (designated A) was composed of 6.0 g. of the complex, 2.5 ml. of methylcyclopentane and 2.5 ml. of n-pentane. The second reaction mixture (designated B) was composed of 6.0 g. of complex, 2.5 ml. of methylcyclopentane and 2.5 ml. of 3-methylpentane. The third reaction mixture (designated C) was composed of 6.0 g. of the complex, 2.5 ml. of methylcyclopentane and 2.5 ml. of 3-methylhexane. These mixtures were continuously shaken and reacted at a temperature of about 31° C. Small samples of the hydrocarbon phases were taken periodically and analyzed for hydrocarbon composition by vapor chromatography. Comparative results are shown in Table V.

It is shown in Table V that even after 276 minutes, in reaction mixture A, there was produced a total of only 1.4% C₁₀ naphthenes which were mainly tetramethyl-

TABLE V

| | Mixture | | | | | |
| --- | --- | --- | --- | --- | --- | --- |
| | A | | B | | C | |
| Reaction Time, minutes | 98 | 276 | 60 | 371 | 59 | 227 |
| Amount C₁₀ naphthene in product | 0.8 | 1.4 | 0.8 | 1.7 | 8.3 | 9.2 |
| Amount dimethyldecalin in product | 2.2 | 3.7 | 1.8 | 4.7 | 2.8 | 4.3 | cyclohexanes and 3.7% dimethyldecalins. After 371 minutes, in reaction mixture B, there was produced only 1.7% C₁₀ naphthenes which were primarily tetramethylcyclohexanes and 4.7% dimethyldecalins. It is clearly apparent however that, in reaction mixture C wherein the paraffinic hydrocarbon reactant contained seven carbon atoms, the yield of C₁₀ naphthene, which was primarily tetramethylcyclohexane, was increased to 9.2% as compared with yields of 1.4 and 1.7% in reaction mixtures A and B wherein the paraffinic hydrocarbon reactant was a C₅ and C₆ paraffin respectively. It is also noted that this higher yield in reaction mixture C was obtained in a shorter reaction time annd that the yield of C₁₀ naphthene was not obtained at the expense of the dimethyldecalins since the yield of dimethyldecalins did not substantially decrease from that shown in reaction mixture B.

When any other C₆ naphthene is substituted for methylcyclopentane and when AlCl₃—HCl is substituted for AlBr₃—HBr, essentially equivalent results are obtained as those shown in the preceding examples.

I claim:

1. Method for preparing dimethyldecalins which comprises contacting a C₆ naphthene hydrocarbon feed substantially free of paraffin hydrocarbon of seven or more carbon atoms at a temperature in the range of −20° C. to 80° C. with a preformed liquid catalyst complex obtained by reacting a paraffin hydrocarbon having at least eight carbon atoms with an aluminum halide selected from the group consisting of AlCl₃ and AlBr₃ and a hydrogen halide selected from the group consisting of HCl and HBr.

2. Method according to claim 1 wherein the temperature is in the range of 20° C. to 75° C.

3. Method in accordance with claim 2 wherein the preformed liquid catalyst complex is obtained by reacting AlBr₃—HBr and a paraffin hydrocarbon having at least eight carbon atoms.

4. Method in accordance with claim 2 wherein the preformed liquid catalyst complex is obtained by reacting AlCl₃—HCl and a paraffin hydrocarbon having at least eight carbon atoms.

References Cited

UNITED STATES PATENTS

| 2,396,331 | 3/1946 | Marschner | 260—666 |
| 2,398,563 | 4/1946 | Smith et al. | 260—683.77 |
| 2,415,066 | 1/1947 | Ross et al. | 260—666 |
| 3,104,266 | 9/1963 | Kron | 260—666 |

DELBERT E. GANTZ, *Primary Examiner.*

DANIEL E. WYMAN, PATRICK P. GARVIN, ALPHONSO D. SULLIVAN, *Examiners.*

C. E. SPRESSER, *Assistant Examiner.*